(12) United States Patent
Blanton et al.

(10) Patent No.: US 6,491,239 B2
(45) Date of Patent: Dec. 10, 2002

(54) PROCESS FOR MILLING COMPOUNDS

(75) Inventors: Thomas N. Blanton, Rochester, NY (US); Dilip K. Chatterjee, Rochester, NY (US); Debasis Majumdar, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 18 days.

(21) Appl. No.: 09/799,314

(22) Filed: Mar. 5, 2001

(65) Prior Publication Data

US 2001/0038048 A1 Nov. 8, 2001

Related U.S. Application Data

(63) Continuation-in-part of application No. 09/306,585, filed on May 6, 1999, now abandoned.

(51) Int. Cl.[7] .............................................. B02C 17/20
(52) U.S. Cl. .......................................... 241/21; 241/184
(58) Field of Search ........................... 501/96; 241/184, 241/21

(56) References Cited

U.S. PATENT DOCUMENTS

| | | | |
|---|---|---|---|
| 4,940,654 A | 7/1990 | Diehl et al. | |
| 5,065,946 A | * 11/1991 | Nishida et al. | 241/16 |
| 5,145,684 A | 9/1992 | Liversidge et al. | |
| 5,257,742 A | * 11/1993 | Yashima et al. | 241/172 |
| 5,554,670 A | 9/1996 | Giannelis et al. | |
| 5,672,302 A | 9/1997 | Chatterjee et al. | |
| 5,679,611 A | * 10/1997 | Chatterjee et al. | 252/520.22 |
| 5,798,308 A | 8/1998 | Chatterjee et al. | |
| 5,804,131 A | 9/1998 | Majumdar et al. | |
| 5,891,611 A | 4/1999 | Majumdar et al. | |

OTHER PUBLICATIONS

Tie Lan, P.D. Kaviratna, and T.J. Pinnavaia, Chem. Mater, 1995, 7,2144–2150.

* cited by examiner

Primary Examiner—Mark Rosenbaum
(74) Attorney, Agent, or Firm—Doreen M. Wells

(57) ABSTRACT

The present invention is a process for the preparation of a solid particles of a compound. The process includes milling the compound in the presence of milling media composed of ceramic particles having an average size of 0.1 to 20 mm. The ceramic particles are composed of a tetragonal zirconia core and a continuous hard case shell comprising cubic zirconia, monoclinic zirconia, spinel or zircon.

10 Claims, 3 Drawing Sheets

FIG. I

PROCESS FOR MILLING COMPOUNDS

CROSS REFERENCE TO RELATED APPLICATIONS

This application is a continuation-in-part of application Ser. No. 09/306,585, filed May 6, 1999, now abandoned.

FIELD OF THE INVENTION

This invention relates to a novel milling media, and more particularly a process for producing fine particles of a compounds using the milling media.

BACKGROUND OF THE INVENTION

Comminution (size reduction by mechanical means) of amorphous and crystalline solids using wet milling techniques such as ball milling or media milling processes is a common technique used in the paint and pigment industry and has recently been exploited for producing small (<1 mm) size particle dispersions of photographic materials, for example, see U.S. Pat. No 4,940,654 to Diehl et al. In such milling applications, milling media are generally selected from a variety of dense materials, such as steel, ceramic or glass. In ball milling processes, both milling efficiency and attrition-related contamination are generally thought to be proportional to media density. Higher viscosity dispersions often require very dense media, such as stainless steel. Media geometries may vary depending on the application, although spherical or cylindrical beads are most commonly used.

Dispersions prepared by these techniques are typically stabilized using a surface agent to prevent agglomeration. In general, it is desirable to obtain the smallest possible particle size while minimizing attrition-related contamination from milling equipment and milling media. Such goals are often contradictory, i.e., the increased energy required to achieve a small particle size often results in excessive levels of metallic, ceramic or other types of contamination. High intensity milling is also desirable to maximize milling efficiencies, (i.e., rate of size reduction).

Attrition-related contamination in compounds useful in imaging elements dispersions (filter dyes, sensitizing dyes, couplers, antifoggants, etc.) and printing inks, based both on dye and pigments, can result in both physical and sensitometric defects. Contamination resulting from the milling process is usually present in the form of dissolved species or particulates of comparable sizes to dispersed product particles. Given this, separation of the contaminant particles from the product particles by filtration is generally ineffective. It is considered preferable to adjust formulation and process parameters and materials to minimize the generation of contaminants.

Attrition from the milling process can also result in chemical alteration of the product dispersion. Many types of ceramic and glass milling media contain metal oxides which release hydroxide ions into the dispersion and increase product pH. Such pH changes are undesirable since this can affect dispersion stability and change milling performance.

A further disadvantage of attrition is the excessive wear of milling media and mill components which can degrade milling performance and increase manufacturing maintenance costs. Most types of conventional media also require preconditioning to achieve a steady rate of wear.

The present invention is directed to a solution to some of the aforementioned problems with preparing fine particles of inorganic and/or organic materials/compounds, particularly useful ingredients to prepare imaging and printing materials.

SUMMARY OF THE INVENTION

The present invention is a process for the preparation of a solid particles of a compound. The process includes milling the compound in the presence of milling media composed of ceramic particles having an average size of 0.1 to 20 mm. The ceramic particles are composed of a tetragonal zirconia core and a continuous hard case shell comprising a material selected from the group consisting of cubic zirconia, monoclinic zirconia and spinel. The continuous hard case shell may also comprise essentially zircon.

Figure 1:
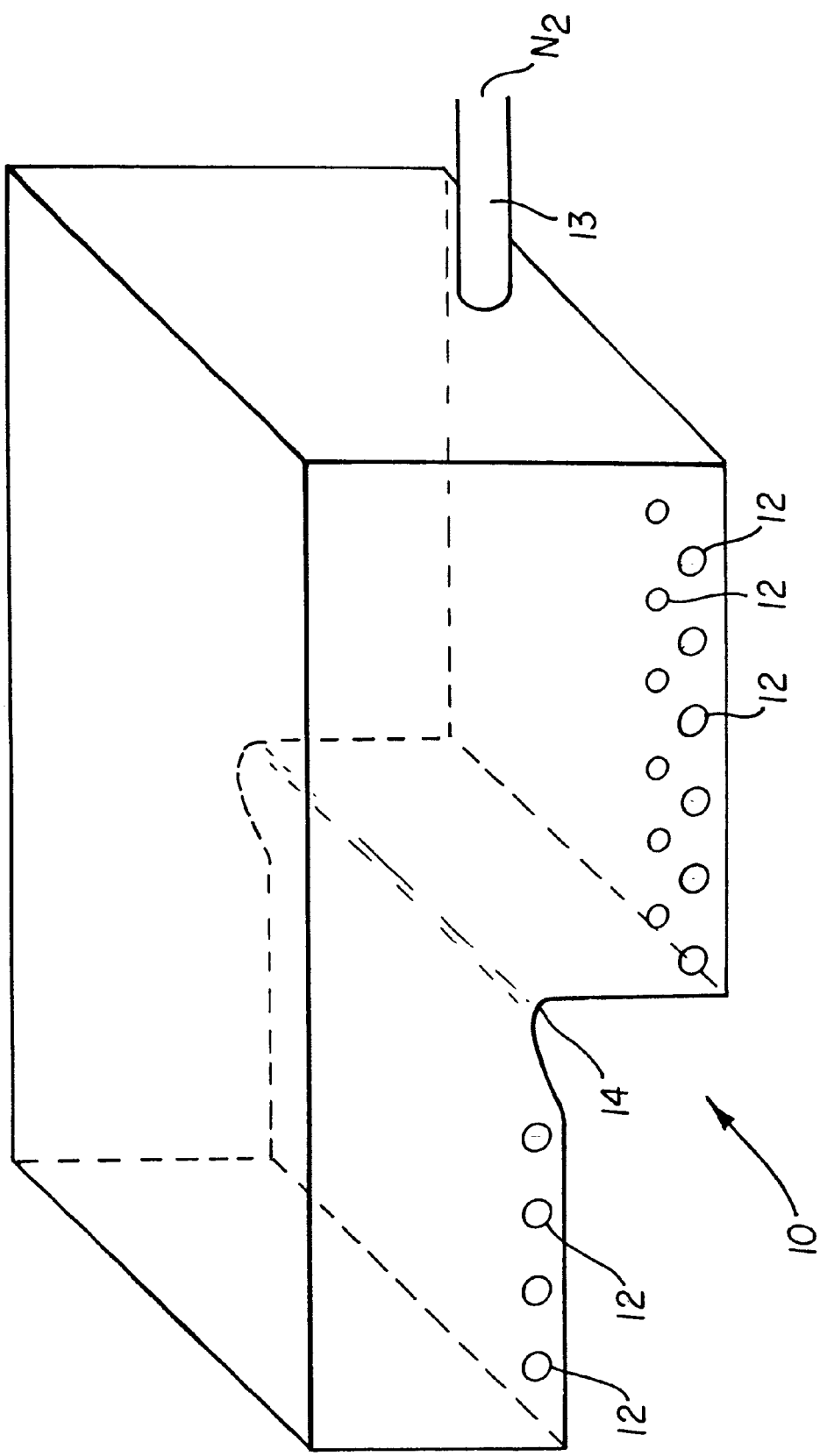
FIG. 1 shows an arrangement of a coating container for creating composite core/shell type of structure of ceramic milling media.

For a better description of the present invention together with other advantages and capabilities thereof reference is made to the following detailed description and claims in connection with the above described drawing.

DETAILED DESCRIPTION OF THE INVENTION

The present invention is based on the discovery that compounds useful in imaging elements and pharmaceuticals can be prepared in extremely fine particles with reduced contamination levels by milling in the presence of milling media comprising a core/shell type composite structure of zirconia. The term "compounds useful in imaging elements" refers to compounds that can be used in photographic elements, electrophotographic elements, thermal transfer elements, and the like.

The present invention of zirconia core/shell type composite milling media is a suitable replacement for conventional glass, polymeric or steel milling media. The milling media of the present invention results in much lower heavy metal contamination. This reduced contamination the milling media of the present invention reduces sensitometric and physical defects in film coatings which are related to soluble or particle contaminants. Finally the reduced contamination with the milling media of the present invention improves both milling media and milling components life. The milling media of the present invention range in size from 0.1 to 20 mm, preferably 0.1 to 3 mm and most preferably from 0.1 to 1 mm.

In the method of this invention a compound useful in imaging elements is prepared in the form of particles by milling the compound useful in imaging elements in the presence of a milling media comprising a core/shell type ceramic composite structure.

The milling media can comprise particles, preferably substantially spherical in shape, e.g., beads, composed of a core/shell type zirconia composite structure.

The core material can be selected from materials known to be useful as milling media when fabricated as spheres or particles. Suitable core materials include zirconium oxides (such as 95% zirconium oxide stabilized with yttria). Preferred core materials have a density greater than about 2.5 g/cm$^3$. The core material should also possess high fracture toughness. The selection of high density core materials with appropriate combination of fracture toughness is believed to facilitate efficient particle size reduction.

The milling media of the present invention utilize particulate alloys of $ZrO_2$ and additional oxide selected from: MgO, CaO, $Y_2O_3$, $Sc_2O_3$ and $Ce_2O_3$ and other rare earth oxides (also referred to herein as "Mg—Ca-Y—Sc—rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having about 1 to about 15 mole percent Mg—Ca—Y—Sc-rare earth oxide exhibit a tetragonal structure. Preferred oxides for alloying with zirconia are $Y_2O_3$, MgO, CaO, $Ce_2O_3$ and combinations of these oxides. For specific preferred amounts of secondary oxides U.S. Pat. No. 5,672,302, incorporated by reference herein, provides the proper concentration ranges. It is preferred that the zirconia powder have a high purity, greater than about 99.9 percent. The preparation of zirconia alloys is well known to those skilled in the art and zirconia alloys are available commercially. For example, particulate zirconia alloy having 2 to 5, preferably 3 mole percent $Y_2O_3$ is marketed by several vendors such as HANWHA Advanced Ceramics (as HWA-ZY 3P), Zirconia Sales Corporation of America (as HSY-3SD), and TOSHO Corporation (as 3YB).

The case material can be selected from materials known to be hard and also which can be produced easily during in-situ processing of the core materials. One example of such core/case material is the functionally gradient hard case on tough zirconia alloys. The hard case can be comprised of cubic zirconia, monoclinic zirconia, spinel, zircon, and combination of various combinations of different crystallographic modifications of zirconia and zircon.

In accordance with the present invention, the hard case of the milling media can be formed by coating a combination of a smectite clay and a suitable polymeric material, on the tough ceramic core and subsequently heat treating the milling media at elevated temperature. This process results in a composite core/case structure for the milling media, as desired for the present invention.

The clay material used in this invention is a smectite clay, preferably one closely resembling the natural clay mineral hectorite in both structure and composition. Hectorite is a natural swelling clay which is relatively rare and occurs contaminated with other minerals such as quartz which are difficult and expensive to remove. Synthetic smectite is free from natural impurities, prepared under controlled conditions. One such synthetic smectite is commercially marketed under the trade name Laponite by Laporte Industries, Ltd. of UK through its US subsidiary, Southern Clay Products, Inc. It is a layered hydrous magnesium silicate, in which magnesium ions, partially replaced by suitable monovalent ions such as lithium, sodium, potassium and/or vacancies, are octahedrally coordinated to oxygen and/or hydroxyl ions, some of which may be replaced by fluorine ions, forming the central octahedral sheet; such an octahedral sheet is sandwiched between two tetrahedral sheets of silicon ions, tetrahedrally coordinated to oxygen. The primary particle size of such clay platelets are typically ~25 nm in lateral dimension and ~1 nm in thickness.

There are many grades of Laponite such as RD, RDS, J, S, etc. each with unique characteristics and can be used for the present invention. Some of these products contain a polyphosphate peptizing agent such as tetrasodium pyrophosphate for rapid dispersion capability; alternatively, a suitable peptizer can be incorporated into Laponite later on for the same purpose. A typical chemical analysis of Laponite RDS and its physical properties, as per Laponite Product Bulletin, are provided below.

TABLE 1

Typical Chemical Analysis

| Component | Weight % |
|---|---|
| $SiO_2$ | 54.5 |
| MgO | 26.0 |
| $Li_2O$ | 0.8 |
| $Na_2O$ | 5.6 |
| $P_2O_5$ | 4.1 |
| Loss on ignition | 8.0 |

TABLE 2

Typical Physical Properties

| Appearance | White Powder |
|---|---|
| Bulk density | 1000 kg/m$^3$ |
| Surface Area | 330 m$^2$/g |
| pH (2% suspension) | 9.7 |
| Sieve analysis, | 98% < 250 micron |
| Moisture content | 10% |

Laponite separates into its primary particles (platelets of lateral dimension of ~25 nm and a thickness of ~1 nm) in deionized aqueous dispersions, commonly referred to as "sols." Typical concentration of Laponite in a sol can be 0.1% through 10%. During dispersion in deionized water an electrical double layer forms around the clay platelets resulting in repulsion between them and no structure build up.

The polymeric material, for the clay-polymer combination as per the present invention, can be a water soluble polymer (e.g., polyvinyl alcohol, polyethylene glycol, polyethylene oxide, polystyrene sulfonate, polyacrylamide, polyvinyl pyrrolidone, etc.), a hydrophilic colloid (e.g., gelatin) or a water insoluble latex or dispersion (e.g., polymers and interpolymers of styrene, styrene derivatives, alkyl acrylates or alkyl methacrylates and their derivatives, olefins, acrylonitrile, polyurethane and polyester ionomers) or combinations.

The polymeric material is combined with a sol containing a smectite clay, preferably a synthetic smectite which is a hydrous sodium lithium magnesium silicate or fluorosilicate with a layered structure. The dispersion of clay particles in the polymer matrix can generally result in the following three types of configuration, as discussed by Lan et al (T. Lan, P. D. Kaviratna and T. J. Pinnavia, Chem. Mater.7, 2144(1995)). (1) Unintercalated clay layers in a face-to-face aggregation, macroscopically segregated from the polymer. (2) Intercalated clay of definite structure formed by the insertion of one or more molecular layers of polymer into the clay host galleries. (3) Exfoliated clay where singular clay platelets are dispersed in a continuous polymer matrix. The latter two arrangements of the clay in the polymer provide the most suitable clay-polymer combination for the practice of the present invention, by exposing the maximum surface area of the clay for its interaction with the milling media. So, it is preferred that the selected polymer is capable of intercalating inside and/or exfoliating the smectite clay, as taught in copending applications U.S. Ser. Nos. 08/937,685 and 08/940,860. Most preferred choice of polymer will include polyvinyl alcohol, polyethylene glycol, polyethylene oxide, polyvinyl pyrrolidone, etc. The smectite clay:polymer ratio in the clay-polymer combination can be chosen according to the specific application and can vary from 0.1:99.9 to 99.9:0.1 but preferably from 1:99 to 30:70. The clay-polymer combination is added to and mixed with the milling media, by a convenient method for example by spraying or ball milling, prior to heat treatment. The clay-polymer combination to milling media ratio can vary from 0.1:99.9 to 20:80 but preferably from 1:99 to 10:90.

The clay-polymer combination when coated on the milling media comprising preferably zirconium oxides (such as 95% zirconium oxide stabilized with yttria) and heat treated at an elevated temperature, greater than 1300° C. and preferably greater than 1500° C., the desired hard case/tough core structure for the milling media is achieved.

The present invention is different from the teachings of U.S. Pat. Nos. 5,798,308 and 5,804,131 wherein a smectite clay sol of varying viscosity is used to form a case/core structure mainly for ceramic cutting tools. The aforementioned patents, however, do not teach of a clay-polymer combination to obtain the case/core structure for milling media, as intended by the present invention.

Intercalation and exfoliation of clay can be conveniently monitored by measuring the basal (001) spacing of the clay platelets using X-ray diffraction technique, as illustrated by Gianellis et al. in U.S. Pat. No. 5,554,670. With intercalation of a polymer in the clay gallery, an increase in the basal spacing of the clay is observed. When completely exfoliated, the diffraction peaks disappear since the crystallographic order is lost.

The milling process can be a dry process, e.g., a dry roller milling process or a wet process, i.e., wet-milling. In preferred embodiments this invention is practiced in accordance with the wet-milling process described in U.S. Pat. No. 5,145,684 and European published application No. 498,482, the disclosures of which are incorporated herein by reference. Thus, the wet milling process can be practiced in conjunction with a liquid dispersion medium and surface modifier such as described in these publications. Useful liquid dispersion media include water, aqueous salt solutions, ethanol, butanol, hexane, glycol and the like. The surface modifier can be selected from known organic and inorganic materials such as described is U.S. Pat. No. 5,145,684 and can be present in an amount of 0.1–90%, preferably 1–80% by weight based on the total weight of the dry particles.

In preferred embodiments, the compound useful in imaging elements can be prepared in submicron or nanoparticulate particle size, e.g., less than about 500 nanometers (nm). It was particularly surprising and unexpected that such fine particles could be prepared at such low levels of contamination.

Milling can take place in any suitable milling mill. Suitable mills include an airjet mill, a roller mill, a ball mill, a media mill an attritor mill, a vibratory mill, a planetary mill, a sand mill, and a bead mill. A planetary mill is preferred when the milling media are made of ceramic materials.

The preferred proportions of the milling media, the compound useful in imaging elements and the optional liquid dispersion medium and surface modifier present in the milling vessel can vary with wide limits and depends for example of the particular compound useful in imaging elements selected, the size and density of the milling media, the type of mill selected etc. The process can be carried out in a continuous batch or semi-batch mode. In planetary mills, it can be desirable to fill 70–90% of the volume of the milling chamber with milling media.

The attrition time can vary widely and depends primarily upon the particular photographically useful compound, mechanical means and residence conditions selected, the initial and desired particle size and so forth. For planetary mills, processing times of less than about 8 hours are generally required.

After attrition is completed, the milling media is separated from the milled particulate product (in either a dry or liquid dispersion form) using conventional separation techniques, such as by filtration, sieving through a mesh screen and the like.

The process can be practiced with a wide variety of compounds useful in imaging elements. In the case of dry milling the compound useful in imaging elements should be capable of being formed into solid particles. In the case of wet milling the compound useful in imaging elements should be poorly soluble and dispersible in at least one liquid medium. By "poorly soluble", it is meant that the compound useful in imaging elements has a solubility in the liquid dispersion medium, e.g., water, of less that about 10 mg/ml, and preferably of less than about 1 mg/ml. The preferred liquid dispersion medium is water. Additionally, the invention can be practiced with other liquid media.

The dispersions of this invention can be used to prepare photographic elements. In preferred embodiments of this invention, a color photographic element comprises at least one layer comprising a dispersion of this invention. In addition to the dispersion of this invention, the photographic element comprises other components typically used in photographic elements.

The dispersions of the invention can be used in any of the ways and in any of the combinations known in the art. Typically, the invention dispersions are incorporated in a silver halide emulsion and the emulsion coated as a layer on a support to form part of a photographic element.

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like.

The process can be practiced with a wide variety of compounds useful in pharmaceutical applications. In the case of dry milling the compound useful in pharmaceutical applications should be capable of being formed into solid particles. In the case of wet milling the compound useful in pharmaceutical applications should be poorly soluble and dispersible in at least one liquid medium. By "poorly soluble", it is meant that the compound useful in imaging elements has a solubility in the liquid dispersion medium, e.g., water, of less than about 10 mg/ml, and preferably of less than about 1 mg/ml. The preferred liquid dispersion medium is water. Additionally, the invention can be practiced with other liquid media.

The dispersions of this invention can be used to prepare pharmaceutical elements. In preferred embodiments of this invention, a pharmaceutical element comprises at least one component comprising a dispersion of this invention. In addition to the dispersion of this invention, the pharmaceutical element comprises other components typically used in pharmaceutical elements including diluents, disintegrants, wetting agents, binders, fillers, lubricants, and the active drug.

The dispersions of the invention can be used in any of the ways and in any of the combinations known in the art.

The present invention is illustrated by the following Examples.

EXAMPLES (1) As discussed earlier that the preferred morphological structure of the milling media is composed of a tough core and hard case material, and the core and case structures are continuous with each other. It was decided that high density material, such as tetragonal zirconia would be most suitable for this, mainly because of its high toughness. The preferred method of producing a hard case on tough core of tetragonal zirconia is described below.

Commercially available yttria doped zirconia balls of various sizes (diameter ranging from 1.00 mm to 10.00 mm), whose crystallographic structures were composed of tetragonal and monoclinic phases, were heated at around 1500° C. to convert all the crystallographic phases to a single tetragonal phase. These tetragonal phase zirconia balls were then coated with an aqueous sol of smectite clay:polyethylene glycol (PEG) combination in a manner described below wherein the clay platelets are intercalated and/or exfoliated by the PEG.

Solution 1 was generated by dispersing 4 g of laponite S in 96 g of deionized water. Solution 2 was generated by dispersing 4 g of 8000 molecular weight PEG in 96 g of deionized water. The final clay:PEG combination sol solution was generated by adding 20 g of solution 1 to 47 g of solution 2.

Figure 2:
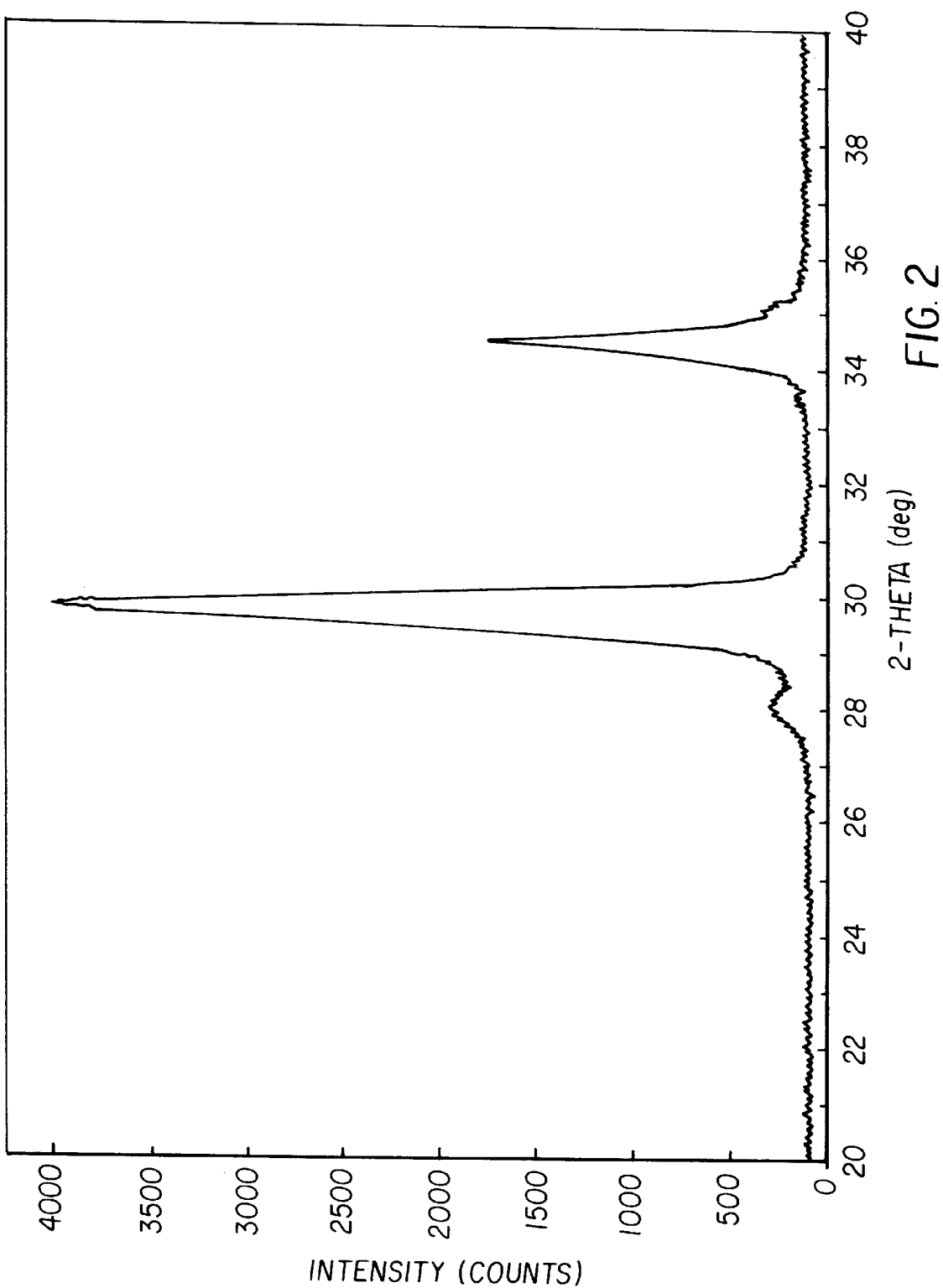
FIG. 2 shows the glancing angle X-ray diffraction patterns collected using a Rigaku RU-300 diffractometer, for zirconia milling media which are uncoated with a clay solution.
Figure 3:
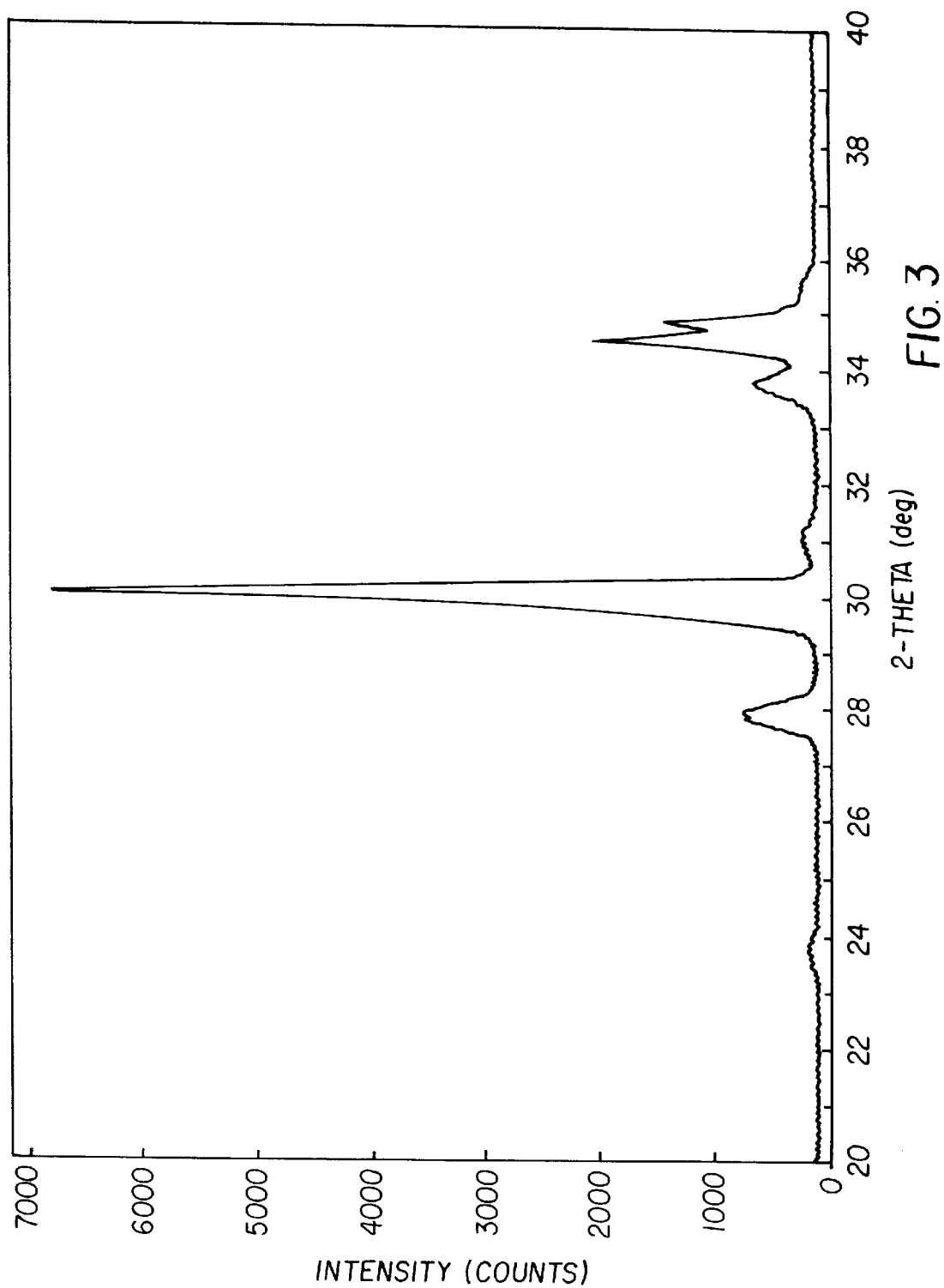
FIG. 3 shows the glancing angle X-ray diffraction patterns collected using a Rigaku RU-300 diffractometer, for zirconia milling media which are coated with a clay solution prior to heat treatment.

Such a clay:PEG combination was added to the specially designed container 10 shown in FIG. 1. The amount of sol in the container 10 was determined from the numbers and also the diameters of the ceramic balls 12 to be coated. The level of the sol was just enough to submerge the balls 12 from quarter to half of their height. Fully tetragonal zirconia balls in the clay:PEG solution were then agitated with a flow of nitrogen gas through inlet 13 to ensure complete coverage of the solution on the balls 12 and also for creating a dried clay:PEG layers on the balls. During the nitrogen gas assisted agitation process the gas pressure was increased to push the balls over the dam 14 on the other side of the container, where they were allowed to dry completely. These balls were then heat treated at about 1500° C. for about 2 hours. Conventional XRD data reveal the core of uncoated and coated zirconia balls are comprised of tetragonal zirconia. Glancing angle X-ray diffraction of these balls revealed the presence of a core/shell type of structure on the balls which are coated with the clay: PEG combination prior to heat treatment. FIG. 2 shows that an uncoated zirconia ball when heat treated has tetragonal zirconia as the only phase detected on the sample surface. FIG. 3 shows that the clay:PEG coated zirconia ball when heat treated contains monoclinic zirconia in the outer shell along with tetragonal zirconia which is part of the gradient from shell to core.

(2) Magenta pigment samples from Sunfast Corporation were ball milled using the milling media generated in example 1 listed above. The pigment was dry milled for 5 hours, then analyzed for particle size using a Horiba LA920 particle size analyzer and presence of elemental zirconium using a Philips PWI1480 wavelength dispersive X-ray fluorescence spectrometer.

The pigment agglomerate size was reduced from 63.2 microns (unmilled pigment) to 37.4 microns (milled pigment, coated milling media). Milling with the coated milling media as described in this invention results in a reduced pigment particle size when compared to pigment milled with uncoated milling media. When the agglomerates were sonicated the mean particle size of the pigment produced by the uncoated grinding media was 0.82 microns, compared to the mean pigment particle size produced by the coated grinding media of 0.77 microns. Contamination due to the milling media was undetected by X-ray fluorescence.

The invention has been described in detail with particular reference to certain preferred embodiments thereof, but it will be understood that variations and modifications can be effected within the spirit and scope of the invention.

What is claimed is:

1. A process for the preparation of solid particles of a compound which process comprises milling said compound in the presence of milling media comprising ceramic particles having an average size of 0.1 to 20 mm, said ceramic particles comprising a tetragonal zirconia core and a continuous hard case shell comprising a material selected from the group consisting of cubic zirconia, monoclinic zirconia and spinel.

2. The process according to claim 1, wherein the solid compounds are useful in pharmaceutical elements.

3. The process according to claim 1, wherein the compound useful in imaging elements is milled in a liquid medium.

4. The process according to claim 1, wherein the milling takes place in a mill selected from the group consisting of an airjet mill, a roller mill, a ball mill, a media mill an attritor mill a vibratory mill, a planetary mill, a sand mill, and a bead mill.

5. The process according to claim 4, wherein the mill is a planetary mill.

6. The process according to claim 1, wherein the solid particles of the compound useful in imaging elements have an average particle size of less than 1 micron.

7. The process according to claim 1, wherein the solid particles of the compound have an average particle size of less than about 500 nanometers.

8. The process according to claim 1, wherein the compound useful in imaging elements is selected from the group consisting of dye-forming couplers, development inhibitor release couplers (DIR's), development inhibitor anchimeric release couplers (DI(A)R's), masking couplers, filter dyes, optical brighteners, nucleators, development accelerators, oxidized developer scavengers, ultraviolet radiation absorbing compounds, sensitizing dyes, development inhibitors, antifoggants, bleach accelerators, magnetic particles, lubricants, and matting agents.

9. A process for the preparation of solid particles of a compound useful in imaging elements which process comprises milling said compound in the presence of milling media comprising ceramic particles having an average size of 0.1 to 20 mm, said ceramic particles comprising a tetragonal zirconia core and a continuous hard case shell consisting essentially of zircon.

10. A process for the preparation of solid particles of a compound which process comprises milling said compound in the presence of milling media comprising ceramic particles having an average size of 0.1 to 20 mm, said ceramic particles comprising a tetragonal zirconia core and a continuous hard case shell consisting essentially of zircon.

* * * * *